US010613582B2

(12) United States Patent
Rosen et al.

(10) Patent No.: US 10,613,582 B2
(45) Date of Patent: *Apr. 7, 2020

(54) DOCKING MECHANISMS AND METHODS OF RESTRAINING TWO PORTIONS OF A COMPUTING DEVICE

(71) Applicant: Microsoft Technology Licensing, LLC, Redmond, WA (US)

(72) Inventors: David Ian Rosen, Bellevue, WA (US); Joseph Benjamin Gault, Settle, WA (US); Cesar Ambriz Rios, Seattle, WA (US); Anthony E. Hillyerd, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,559

(22) Filed: Apr. 12, 2019

(65) Prior Publication Data

US 2019/0235573 A1    Aug. 1, 2019

Related U.S. Application Data

(63) Continuation of application No. 15/785,987, filed on Oct. 17, 2017, now Pat. No. 10,303,214.

(51) Int. Cl.
    *G06F 1/16*     (2006.01)
    *F16B 2/14*     (2006.01)
    *F16B 21/16*    (2006.01)

(52) U.S. Cl.
    CPC .............. *G06F 1/1632* (2013.01); *F16B 2/14* (2013.01); *G06F 1/1654* (2013.01); *G06F 1/1679* (2013.01); *F16B 21/16* (2013.01)

(58) Field of Classification Search
    CPC ............................ G06F 1/1632; G06F 1/1654
    See application file for complete search history.

(56) References Cited

U.S. PATENT DOCUMENTS

| 10,303,214 B2 * | 5/2019 | Rosen ................... G06F 1/1679 |
| 2014/0133080 A1 * | 5/2014 | Hwang ................. G06F 1/1632 361/679.17 |
| 2015/0055289 A1 * | 2/2015 | Chang ................... G06F 1/1632 361/679.43 |
| 2016/0266616 A1 * | 9/2016 | Chang ................... G06F 1/1683 |

OTHER PUBLICATIONS

"Final Office Action Issued in U.S. Appl. No. 15/804,796", dated Jun. 28, 2019, 8 Pages.

* cited by examiner

*Primary Examiner* — Anthony Q Edwards
(74) *Attorney, Agent, or Firm* — Ray Quinney & Nebeker P.C.; Paul N. Taylor

(57) ABSTRACT

A docking mechanism is described. The docking mechanism may include a locking protrusion and a locking receptacle configured to receive the locking protrusion and having an inclined surface. The docking mechanism may include a wedging member abutting the inclined surface. The docking mechanism may include a locking detent. The locking detent may have a spring configured to bias the locking detent towards the locking protrusion. Computing devices that include docking mechanisms are also described. Methods of use of the docking mechanisms are also described.

28 Claims, 9 Drawing Sheets

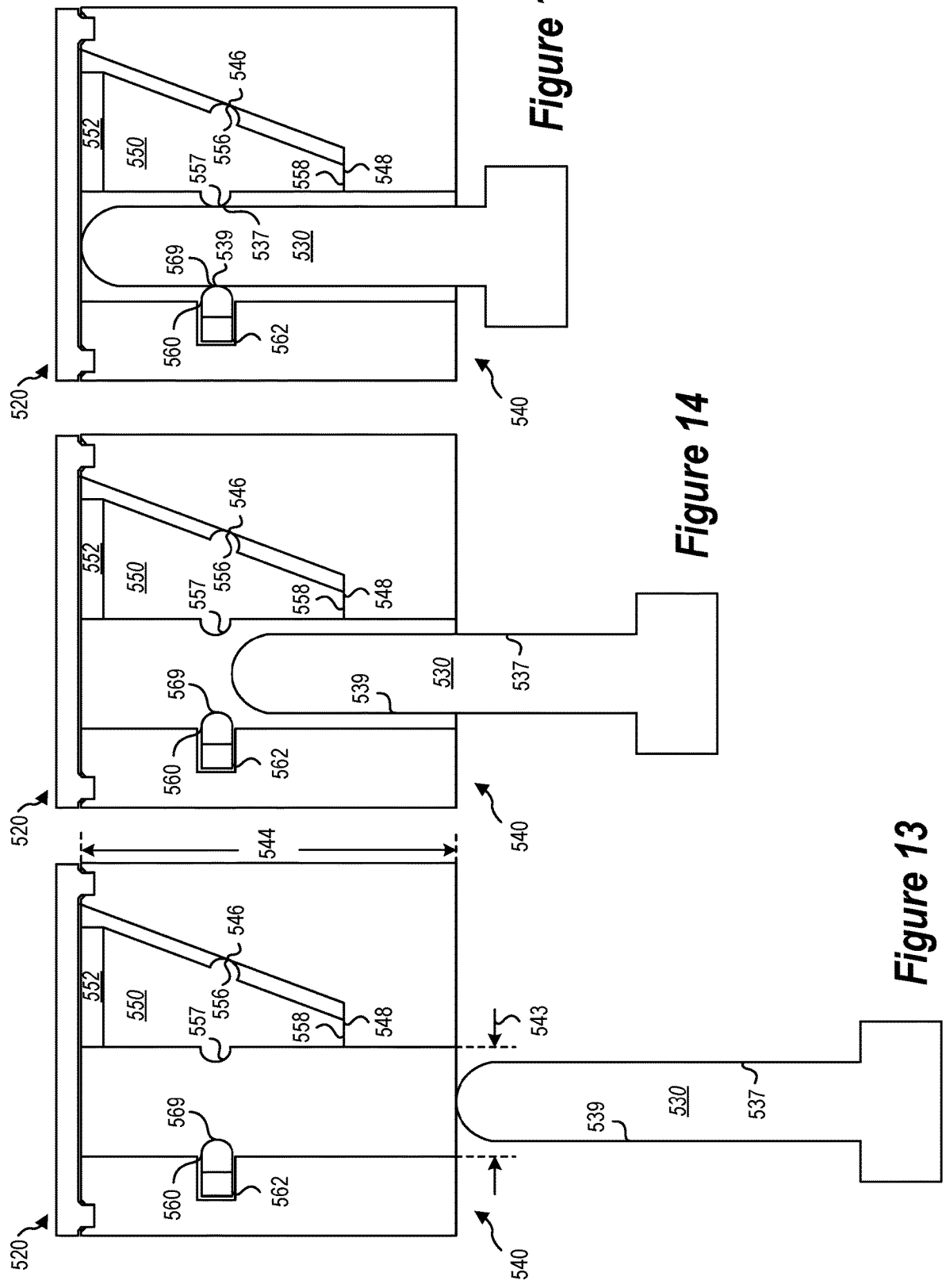

DOCKING MECHANISMS AND METHODS OF RESTRAINING TWO PORTIONS OF A COMPUTING DEVICE

CROSS-REFERENCE TO RELATED APPLICATIONS

This application is a continuation of U.S. patent application Ser. No. 15/785,987, filed Oct. 17, 2017, which is hereby incorporated by reference in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computer. Hybrid computers may act as a tablet computer or a laptop computer. Many hybrid computers include input devices that may be separated from the screen.

The subject matter claimed herein is not limited to implementations that solve any disadvantages or that operate only in environments such as those described above. Rather, this background is only provided to illustrate one example technology area where some implementations described herein may be practiced.

BRIEF SUMMARY

In one implementation, a docking mechanism is described. The docking mechanism may include a locking protrusion and a locking receptacle configured to receive the locking protrusion and having an inclined surface. The docking mechanism may include a wedging member abutting the inclined surface. The docking mechanism may include a locking detent. The locking detent may have a spring configured to bias the locking detent towards the locking protrusion.

In another implementation, a computing device is described. The computing device includes a locking protrusion and a locking receptacle configured to receive the locking protrusion and having an inclined surface. The computing device includes a wedging member having a spring configured to bias the wedging member toward the locking protrusion. At least a portion of a front surface of the wedging member being curved and at least a portion of a back surface of the wedging member being curved. The curved portion of the back surface abutting the inclined surface in a restraining state. The curved portion of the front surface abutting the locking protrusion in a biased state. The computing device includes a locking detent having a spring configured to bias the detent towards the locking protrusion. One or more of the wedging member and the locking protrusion or the locking detent and the locking protrusion being in line to surface, point to surface, line to line, point to line, or point to point contact.

In a further implementation, a method for restraining two portions of a computing device is described. The method includes inserting a locking protrusion of a first portion into a locking receptacle of a second portion. A separation force is applied between the first portion and the second portion. If the separation force is less than 40 Newtons, separation of the first portion from the second portion is resisted. If the separation force is greater than 50 Newtons, the first portion is separated from the second portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 13 is a cutaway side view of yet another implementation of a docking mechanism in an undocked configuration;

FIG. 14 is a cutaway side view of the implementation of the docking mechanism in FIG. 13 with the locking protrusion partially inserted into the locking receptacle;

FIG. 15 is a cutaway side view of the implementation of a docking mechanism in FIG. 13 with the locking protrusion fully inserted into the locking receptacle and a biasing member of a wedging member in a restraining state.

DETAILED DESCRIPTION

This disclosure generally relates to docking mechanisms and methods of restraining two portions of a computing device. More particularly, this disclosure generally relates to docking mechanisms, systems, and methods for securing computing devices.

Figure 1:
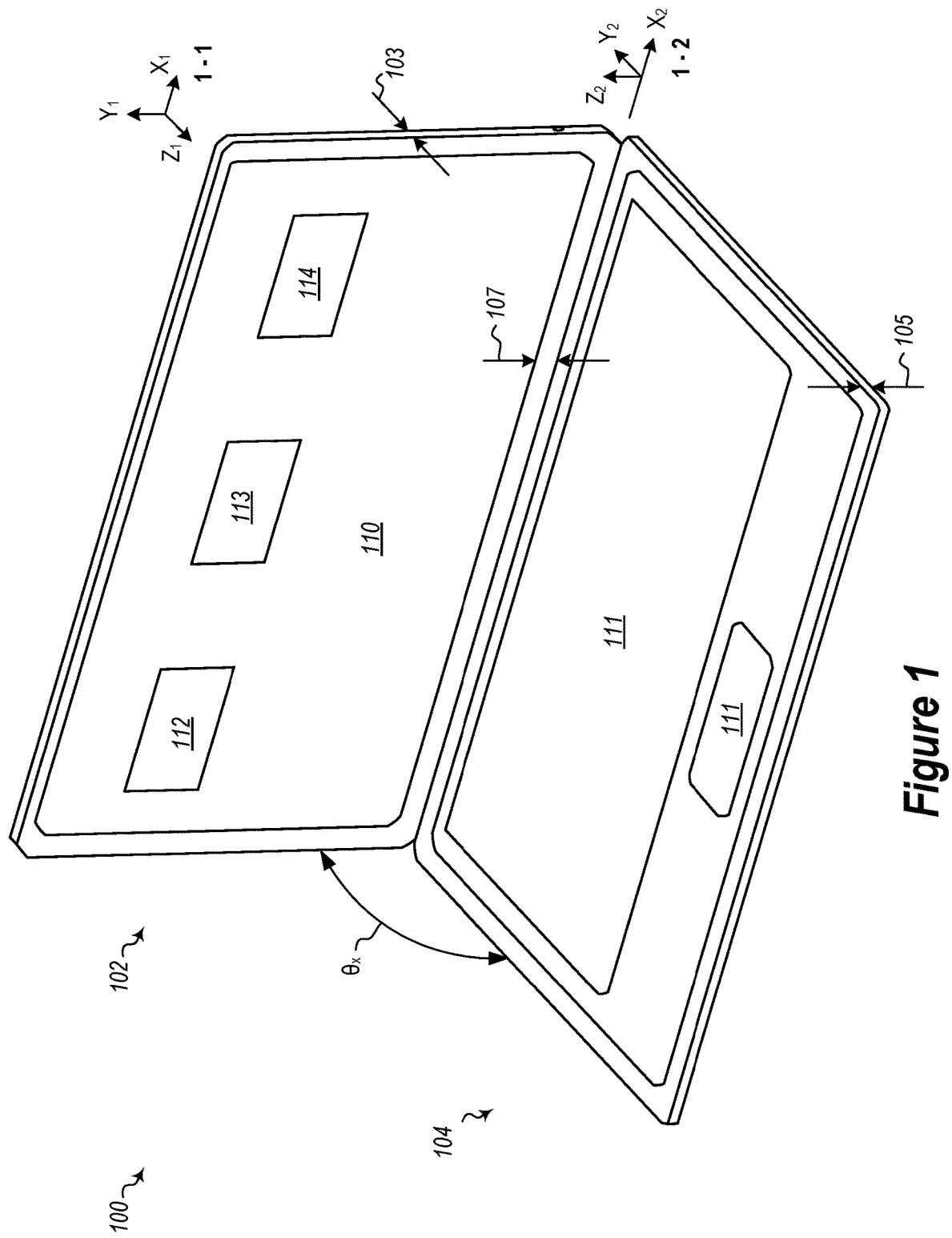
FIG. 1 is an isometric view of an implementation of a computing device.
Figure 2:
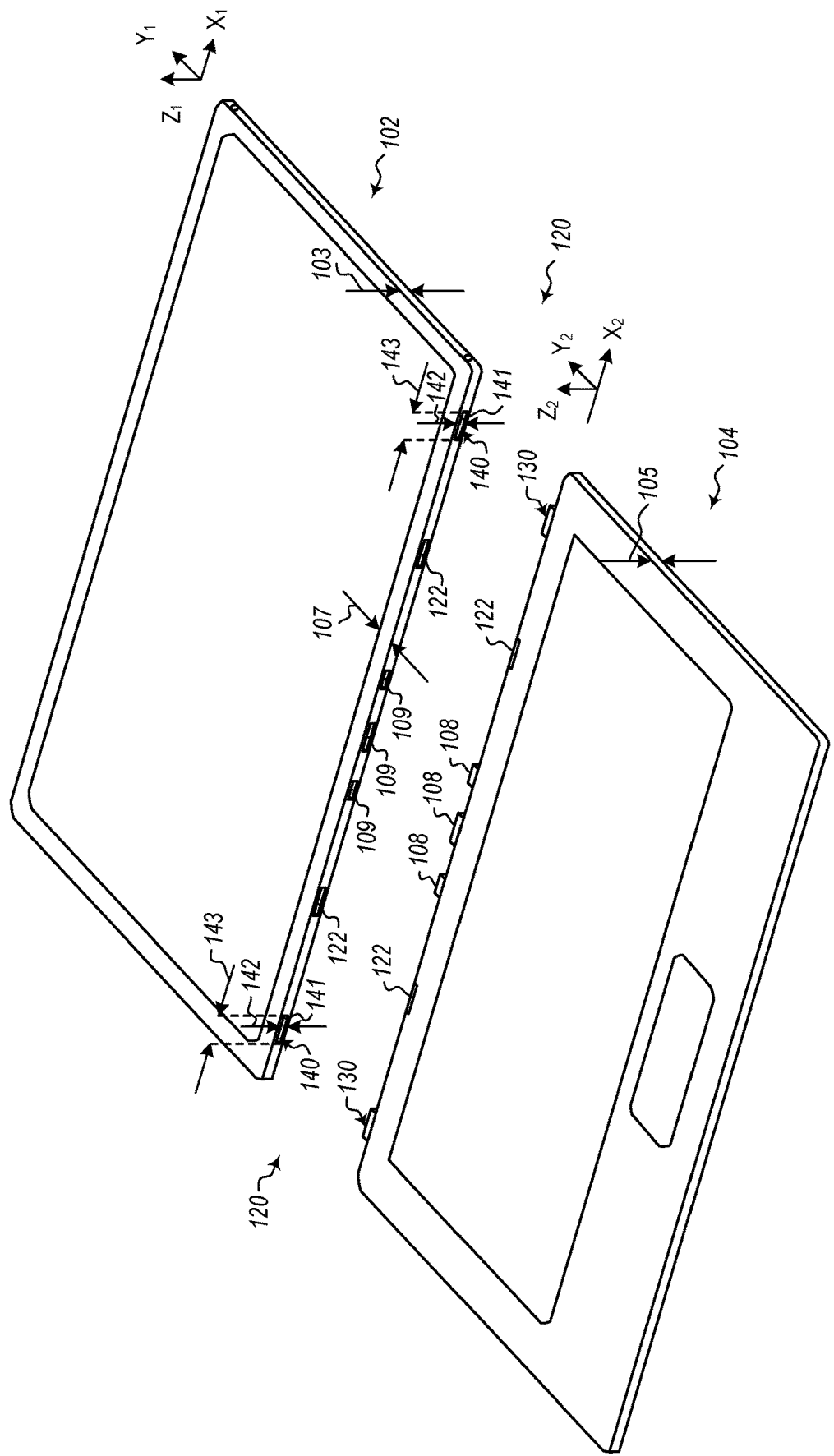
FIG. 2 is an isometric perspective separated view of the implementation of the computing device in FIG. 1.

FIG. 1 is an isometric view of an implementation of a computing device 100 and FIG. 2 is an isometric perspective separated view of the implementation of the computing device 100 in FIG. 1. Referring generally to the computing device 100 shown in FIGS. 1 and 2, the computing device 100 may include a first portion 102 and a second portion 104. The first portion 102 may be separably connected to the second portion 104 by a docking mechanism 120. For example, the first portion 102 may be mechanically connected to the second portion 104 in a docked (and/or locked) configuration, such as the docked configuration shown in FIG. 1. The first portion 102 may transition from the docked configuration to an undocked configuration, such as the undocked configuration shown in FIG. 2. The first portion 102 and the second portion 104 may transition from the connected to the undocked configuration and from the unconnected to the docked configuration.

The docking mechanism 120 may include a locking protrusion 130 and a locking receptacle 140 (shown in FIG. 2). The locking receptacle 140 may include an aperture 141 through which the locking protrusion 130 may be inserted.

By way of orientation, a first coordinate system 1-1 (including the x1-direction, the y1-direction, and the z1-direction) is provided for the first portion 102 and a second coordinate system 1-2 (including the x2-direction, the y2-direction, and the z2-direction) is provided for the second portion 104. In the illustrated configuration, these coordinate systems 1-1, 1-2 are rotated about their respective x-axes. When the angle ($\theta_x$) between the first portion 102 and the second portion 104 is 180 degrees, the x1 and x2 axes are parallel, the y1 and the y2 axes, and the z1 and the z2 axes are parallel. When the angle ($\theta_x$) between the first portion 102 and the second portion 104 is ninety degrees, the x1 and x2 axes are parallel, the y1 and the z2 axes are parallel, and the z1 and the y2 axes are parallel (but opposite (e.g., with positive values extending in opposite directions)). For ease of description, front is the positive z-direction, back is the negative z-direction, top is the positive y-direction, bottom is the negative y-direction, right is the positive x-direction, and left is the negative x-direction. Although not shown in the remaining figures, similar orientation will be used for ease of description.

The first portion 102 may include a display 110. The display 110 may be a touch-sensitive display screen. The second portion 104 may include an input device 111. The input device 111 may include a keyboard, a touchpad, one or more buttons, other input devices, or combinations thereof that may be used to provide input to the processor 112. Although a hybrid computing device is shown, the present disclosure may be used with other computing devices where two portions are separably connected together. For example, the first portion 102 may be a mobile phone and the second portion 104 may be a cover, a keyboard, or other device. In other implementations, the docking mechanisms described herein may be used in a non-computing (e.g., purely mechanical) environment.

Although FIG. 1 and FIG. 2 illustrate the display 110 of the first portion 102 and the input device 111 of the second portion 104 as facing each other (e.g., both being on the front side of their respective portions), in at least one implementation described herein, the first portion 102 and second portion 104 may be reversible. For example, the first portion 102 may connect to the second portion 104 as shown (e.g., with the display 110 facing the front) and may be undocked, rotated 180 degrees, and docked to the second portion 104 such that the first portion 102 faces the opposite direction (e.g., with the display 110 facing the back). Thus, the docking mechanism 120 may be configured to allow a reversible connection between the first portion 102 and the second portion 104.

The first portion 102 and/or the second portion 104 may include a processor 112, memory 113, a battery 114, other computing components, or combinations thereof. For example, as shown, the first portion 102 may include a processor 112, memory 113, and a battery 114 while the second portion 104 may also include a processor 112. In some implementations, only one of the first portion 102 or the second portion 104 may include a processor 112. In other implementations, both of the first portion 102 and the second portion 104 include a processor 112. In further implementations, one or more computing components (e.g., processors 112, memory 113, and battery 114) may be included in the first portion 102 and/or the second portion 104 in any combination.

The computing components in the second portion 104 may be in electronic communication with one or more of the computing components in the first portion 102. For example, as shown in FIG. 2, the first portion 102 and the second portion 104 may be in electronic communication via a physical electrical connector that includes an electrical protrusion 108 and an electrical receptacle 109.

As shown in FIG. 2, one or more electrical protrusions 108 are located on the second portion 104 and one or more electrical receptacles 109 are located on the first portion 102. In other implementations, one or more electrical receptacles 109 are located on the second portion 104 and one or more electrical protrusions 108 are located on the first portion 102. In further implementations, the first portion 102 and the second portion 104 may include one or more electrical receptacles 109 and one or more electrical protrusions 108, such that each of the first portion 102 and second portion 104 may include a combination of electrical receptacles 109 and electrical protrusions 108.

The electrical protrusions 108 and/or electrical receptacles 109 may include various electrical connections. As shown, the electrical protrusions 108 and electrical receptacles 109 include multiple pin connectors. In implementations where computing components (e.g., the processor 112, memory 113, or battery 114) are on separate portions (e.g., first portion 102 and second portion 104), maintaining electrical communication between the first portion 102 and the second portion 104 may be important. For example, if a computing component on the second portion 104 were to lose electrical communication with an electrical component on the first portion 102, the computing device 100 may fail (e.g., an operating system may crash or a computing component may be affected by a power surge when the electrical connection is restored). Some electrical connections may be sensitive (e.g., high speed). Thus, in some implementations, it may be desirable for the first portion 102 and the second portion 104 to be securely connected together in the docked configuration by a docking mechanism 120. Furthermore, in some implementations, it may be desirable for a computing component (e.g., the processor 112, memory 113, or battery 114) in the second portion 104 to hand off its responsibilities to a computing component (e.g., the processor 112, memory 113, or battery 114) on the first portion 102 (or vice versa) before undocking from the first portion 102.

The computing device 100 may include one or more docking mechanisms 120. As illustrated in FIG. 2, the computing mechanism includes two docking mechanisms 120. In other implementations, more or fewer docking mechanisms 120 may be used. For example, a single docking mechanism 120 may be used. The single docking mechanism 120 may incorporate both a single locking protrusion 130 and one or more components of one or more electrical protrusions 108 into the single docking mechanism 120 to be inserted into a single locking receptacle 140 that includes one or more components of one or more electrical receptacles 109.

The one or more docking mechanisms 120, as illustrated, may include one or more locking receptacles 140 on the first portion 102 and one or more locking protrusions 130 on the second portion 104. In other implementations, the first portion 102 and the second portion 104 may each include one or more locking protrusions 130 and corresponding one or more locking receptacles 140. In other words, the first portion 102 may include a first locking protrusion 130, a second locking receptacle 140, and a third locking protrusion 130; and the second portion 104 may include a first locking receptacle 140 corresponding to the first locking protrusion 130 on the first portion 102, a second locking protrusion 130 corresponding to the second locking receptacle 140 on the first portion, and a third locking receptacle 140 corresponding to the third locking protrusion 130 on the first portion. More and or fewer combinations of docking mechanisms 120 in either configuration (e.g., only locking protrusions 130 or locking receptacles 140 on each portion or combinations of locking protrusions 130 or locking receptacles 140 on each portion) may be used.

As described above, in some implementations, the one or more docking mechanisms 120 may include one or more magnets 122. As shown, in FIG. 2 each docking mechanism 120 may include one or more magnets 122. In other implementations, one magnet 122 may be used for more than one docking mechanism 120 and/or more than one magnet 122 may be used for each docking mechanism 120.

The locking protrusions 130, in the illustrated implementation, may include a planar upper surface and a planar lower surface. The locking protrusions 130 may have edges that are rounded, chamfered, otherwise shaped, or combinations thereof.

The first portion 102 and the second portion 104 may have thicknesses 103 and 105, respectively. In some implementations, the thicknesses 103, 105 may be in a range having an upper value, a lower value, or upper and lower values including any of 3.0 millimeters, 4.0 millimeters, 5.0 millimeters, 6.0 millimeters, 7.0 millimeters, 8.0 millimeters, 10.0 millimeters, or any value therebetween. For example, the thicknesses 103, 105 may be greater than 3.0 millimeters. In other examples, the thicknesses 103, 105 may be less than 10.0 millimeters. In yet other examples, the thicknesses 103, 105 may be in a range of 3.0 millimeters to 10.0 millimeters.

The display 110 may be spaced from an edge of the first portion 102 by a distance 107. In some implementations, the distance 107 may be in a range having an upper value, a lower value, or upper and lower values including any of 0.0 millimeters, 0.1 millimeters, 0.5 millimeters, 1.0 millimeters, 2.0 millimeters, 3.0 millimeters, 4.0 millimeters, 5.0 millimeters, 6.0 millimeters, 7.0 millimeters, 8.0 millimeters, 10.0 millimeters, 15.0 millimeters, 20.0 millimeters or any value therebetween. For example, the distance 107 may be greater than 0.1 millimeters. In other examples, the distance 107 may be less than 20.0 millimeters. In yet other examples, the distance 107 may be in a range of 0.0 millimeters to 12.0 millimeters. For example, in some implementations, the distance 107 may be 0.0 millimeters. In these implementations, the docking mechanism 120 may have even less space than that shown, as the display 110 would extend to the edge of the device 100.

As devices continue to decrease in size and/or displays continue to increase in size, the amount of available space for components of a docking mechanism decreases. For example, the thickness 103 of the first portion 102 and/or the distance 107 of the display 110 from an edge of the first portion 102 may reduce the available space for the locking receptacle 140. In other words, one or more of a height 142 (e.g., in the z-direction), width 143 (e.g., in the x-direction), depth (e.g., depth 244) (e.g., in the y-direction) of a locking receptacle 140 may be constrained by one or more of the thickness 103 of the first portion 102 and the distance 107 between the display 110 and an edge of the first portion 102. In implementations where there is more space, actuators or other locking mechanisms may be used to lock and unlock the first and second portions. However, in implementations where space is constrained, there may not be sufficient space for actuators or other locking mechanisms. In at least one implementation, the docking mechanism 120 may be used without an actuator.

In some implementations, the height 142 of the locking receptacle 140 may be in a range having an upper value, a lower value, or upper and lower values including any of 0.50 millimeters, 1.0 millimeters, 2.0 millimeters, 3.0 millimeters, 5.0 millimeters, 10.0 millimeters, or any value therebetween. For example, the height 142 may be greater than 0.5 millimeters. In other examples, the height 142 may be less than 7.0 millimeters. In yet other examples, the height 142 may be in a range of 0.5 millimeters to 10.0 millimeters.

In some implementations, the width 143 of the locking receptacle 140 may be in a range having an upper value, a lower value, or upper and lower values including any of 2.0 millimeters, 3.0 millimeters, 5.0 millimeters, 10.0 millimeters, 15.0 millimeters, 20.0 millimeters or any value therebetween. For example, the width 143 may be greater than 2.0 millimeters. In other examples, the width 143 may be less than 20.0 millimeters. In yet other examples, the width 143 may be in a range of 2.0 millimeters to 20.0 millimeters. In further implementations, the docking mechanism 120 may extend along a majority of the bottom of the first portion 102. For example, the width 143 of the locking receptacle 140 in these implementations may be in a range having an upper value, a lower value, or upper and lower values including any of 20.0 millimeters, 30.0 millimeters, 55.0 millimeters, 100.0 millimeters, 150.0 millimeters, 200.0 millimeters, 250.0 millimeters, 300.0 millimeters, or any value therebetween. For example, the width 143 may be greater than 20.0 millimeters. In other examples, the width 143 may be less than 300.0 millimeters. In yet other examples, the width 143 may be in a range of 20.0 millimeters to 300.0 millimeters.

In some implementations, the depth (e.g., depth 244) of the locking receptacle 140 may be in a range having an upper value, a lower value, or upper and lower values including any of 1.0 millimeters, 2.0 millimeters, 3.0 millimeters, 5.0 millimeters, 7.0 millimeters, 10.0 millimeters, or any value therebetween. For example, the depth (e.g., depth 244) may be greater than 1.0 millimeters. In other examples, the depth (e.g., depth 244) may be less than 10.0 millimeters. In yet other examples, the depth (e.g., depth 244) may be in a range of 1.0 millimeters to 10.0 millimeters. In one example, the height 142 may be less than 5.0 mm, the width 143 may be less than 10.0 mm, and the depth (e.g., depth) 244 may be less than 4.5 mm. In another example, the width 143 may be less than 5.0 mm.

An aspect ratio (e.g., between the height 142 and the depth (e.g., depth 244)) of the aperture 141 may be greater than 1:3. In some implementations, the aspect ratio may be in a range having an upper value, a lower value, or upper and lower values including any of 1:3, 1:4, 1:5, 1:6, 1:7, 1:8, or any value therebetween. For example, the aspect ratio may be greater than 1.8. In other examples, the aspect ratio may be less than 1:3. In yet other examples, the aspect ratio may be in a range of 1.8 to 1:3.

The docking mechanism 120 may be replaced with any docking mechanism or one or more components of any docking mechanism described herein. For example, the docking mechanism 120 may be replaced with the docking mechanism 320 described in connection with FIGS. 7-9, the locking protrusion 130 may be replaced with the locking protrusion 430 described in connection with FIGS. 10-12, and one or more of the biasing members 352, 362 may be replaced with one or more of the biasing members 552, 562 described in connection with FIGS. 13-15.

Figure 3:
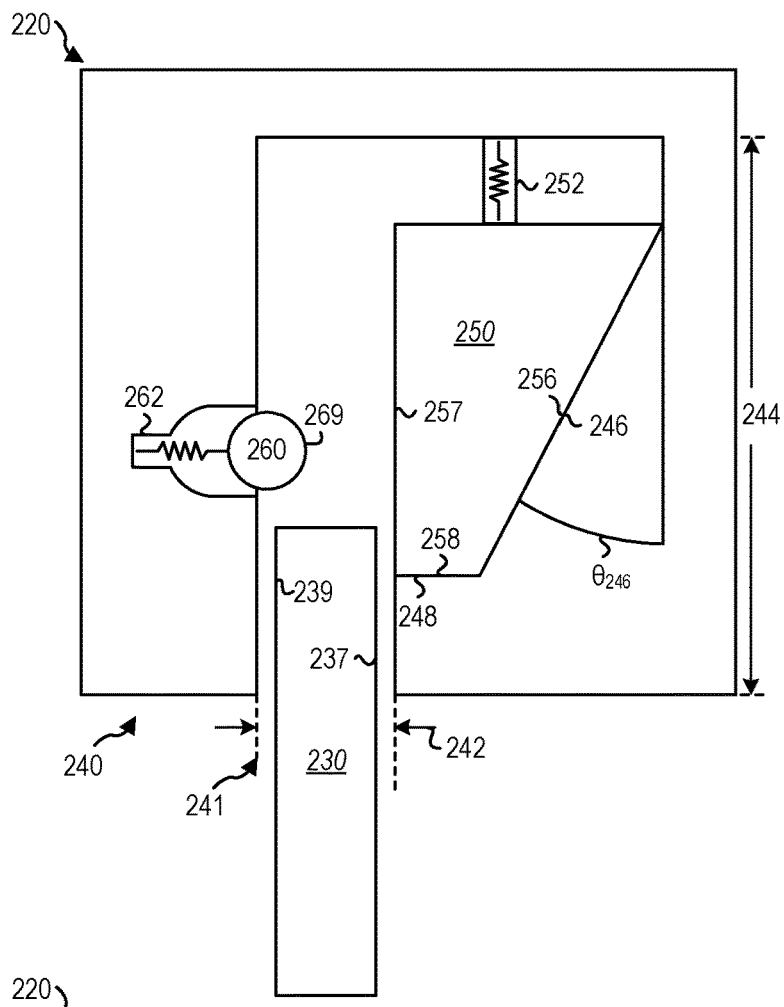
FIG. 3 is a cutaway side view of an implementation of a docking mechanism in an undocked configuration with a locking protrusion partially inserted into a locking receptacle.
Figure 4:
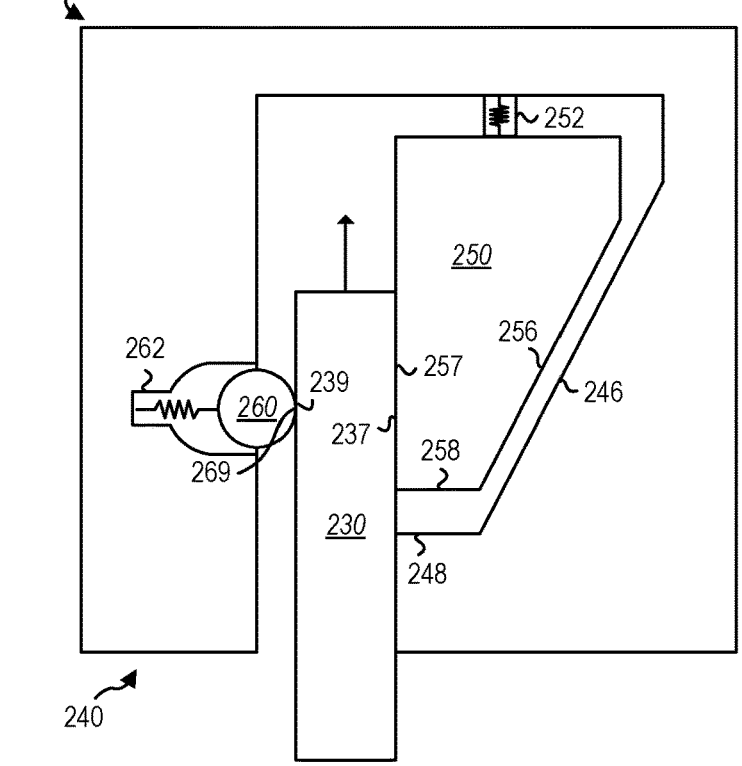
FIG. 4 is a cutaway side view of the implementation of the docking mechanism in FIG. 3 with the locking protrusion engaged with components of the locking receptacle.
Figure 5:
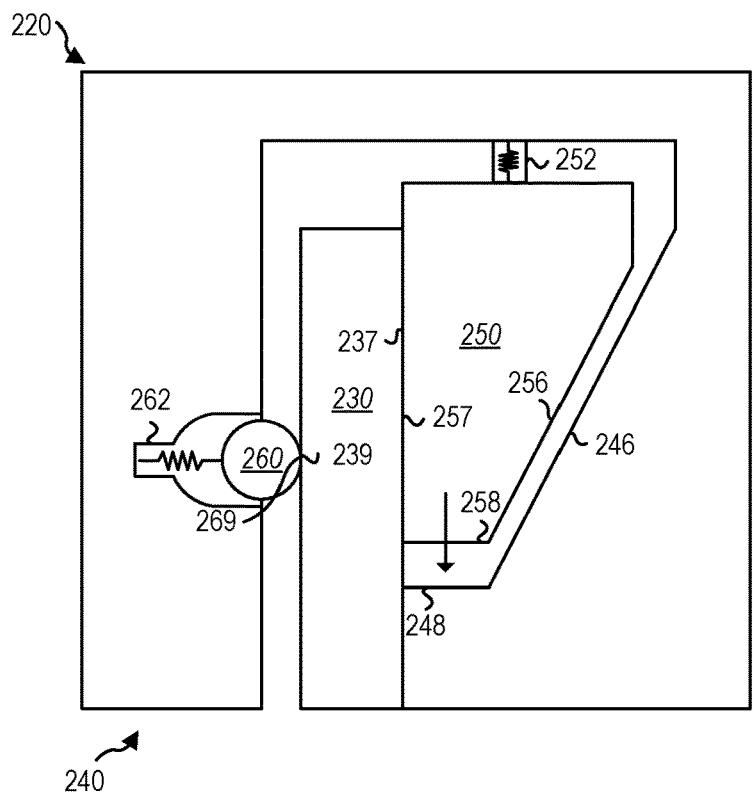
FIG. 5 is a cutaway side view of the implementation of a docking mechanism in FIG. 3 with the locking protrusion fully inserted into the locking receptacle and a biasing member of a wedging member in a biased state.
Figure 6:
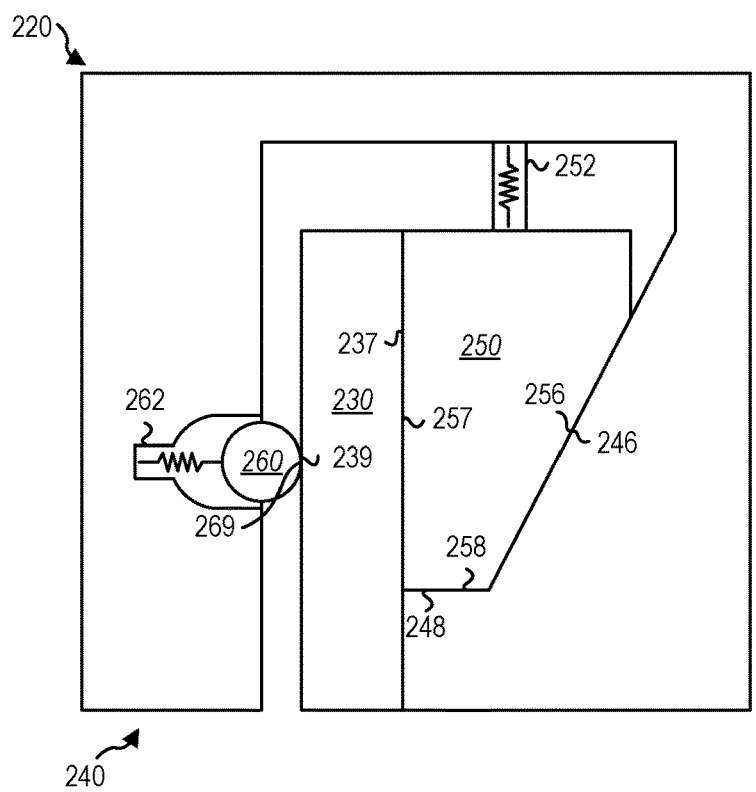
FIG. 6 is a cutaway side view of the implementation of a docking mechanism in FIG. 3 with the locking protrusion fully inserted into the locking receptacle and the wedging member in a restraining state.

FIG. 3 is a cutaway side view of an implementation of a docking mechanism 220 in an undocked configuration with a locking protrusion 230 partially inserted into a locking receptacle 240. FIG. 4 is a cutaway side view of the implementation of the docking mechanism 220 in FIG. 3 with the locking protrusion 230 engaged with components of the locking receptacle 240. FIG. 5 is a cutaway side view of the implementation of a docking mechanism 220 in FIG. 3 with the locking protrusion 230 fully inserted into the locking receptacle 240 and a biasing member 252 of a wedging member 250 in a biased state. FIG. 6 is a cutaway side view of the implementation of a docking mechanism 220 in FIG. 3 with the locking protrusion 230 fully inserted into the locking receptacle 240 and the wedging member 250 in a restraining state.

Referring generally to FIGS. 3-6, the docking mechanism 220 may be used instead of or in addition to any docking mechanism described herein. The docking mechanism 220 may include a locking protrusion 230 and a locking receptacle 240. The locking protrusion 230 may be connected (e.g., directly, integrally, or otherwise connected) to a first portion (e.g., first portion 102) and the locking receptacle 240 may be connected to a second portion (e.g., second portion 104). In other implementations, the locking protrusion 230 may be connected to a second portion and the locking receptacle 240 may be connected to a first portion. Although the locking protrusion 230 is shown unattached to a first or second portion, the locking protrusion 230 is shown as the portion of the locking protrusion 230 that extends into the locking receptacle 240. In some implementations, the portion of the locking protrusion 230 that extends into the locking receptacle 240 may be directly connected to the first or second portion (e.g., first portion 102 and second portion 104). In other implementations, the locking protrusion 230 may be longer than the portion that extends into the locking receptacle 240.

Components (e.g., one or more of a locking protrusion 230, locking receptacle 240, wedging member 250, locking detent 260, magnets 122, or combinations thereof) of the docking mechanism 220 cooperate to limit movement of the first portion and the second portion with respect to each other. For example, the locking protrusion 230 and components of the locking receptacle 240 may cooperate to resist a separation force (e.g., in the direction of the length of the locking protrusion 230) of less than 30 Newtons (e.g., excluding any component of the force of gravity). Resisting a separation force may include, for example, separation movement (e.g., movement of the locking protrusion 230 out of the locking receptacle 240) of the locking protrusion 230 and the locking receptacle of less than 1 millimeter for a sustained (e.g., continuous for a period of time or above an amount for a period of time) separation force. In some implementations, the separation force that the components of the docking mechanism 220 may cooperate to resist may be in a range having an upper value, a lower value, or upper and lower values including any of 10 Newtons, 15 Newtons, 20 Newtons, 25 Newtons, 30 Newtons, 35 Newtons, 40 Newtons, 50 Newtons, 60 Newtons, 75 Newtons, 100 Newtons, or any value therebetween. For example, the resisted separation force may be greater than 10 Newtons. In other examples, the resisted separation force may be less than 100 Newtons. In yet other examples, the resisted separation force may be in a range of 10 Newtons to 75 Newtons. Separation forces greater than 30 Newtons may be difficult for some users to achieve. For example, elderly or infirm users may not have sufficient strength to separate a first portion from a second portion.

In some implementations, one or more docking mechanisms 220 may be used. In implementations with a plurality of docking mechanisms 220, the docking mechanisms may combine to resist separation forces in the values and/or ranges provided above. In some implementations, one or more magnets (e.g., magnets 122 in FIG. 2) and one or more docking mechanisms 220 may be used. In implementations with a plurality of docking mechanisms 220 and/or a plurality of magnets, the docking mechanisms and/or magnets may combine to resist separation forces in the values and/or ranges provided above.

Components of the docking mechanism 220 may include the locking protrusion 230, locking receptacle 240, wedging member 250, locking detent 260, other components, or combinations thereof. The locking protrusion 230 may include a back surface 237 and a front surface 239. The locking protrusion 230 may include a top surface (not labeled) and a bottom surface (not labeled).

The locking protrusion 230 may have a length extending between the top and bottom surface. In some implementations, the length may be in a range having an upper value, a lower value, or upper and lower values including any of 1.0 millimeters, 1.5 millimeters, 2.0 millimeters, 2.5 millimeters, 3.0 millimeters, 3.5 millimeters, 4.0 millimeters, 4.5 millimeters, 5.0 millimeters, 6.0 millimeters, 7.5 millimeters, 10.0 millimeters, or any value therebetween. For example, the length may be greater than 1.0 millimeters. In other examples, the length may be less than 10.0 millimeters. In yet other examples, the length may be in a range of 1.0 millimeters to 10.0 millimeters. Shorter lengths (e.g., less than 10.0 millimeters) make it more difficult to retain the first portion and the second portion.

The locking protrusion 230 may have a width extending between the back surface 237 and the front surface 239. The width, in some implementations, may be in a range having an upper value, a lower value, or upper and lower values including any of 3.0 millimeters, 4.0 millimeters, 5.0 millimeters, 6.0 millimeters, 7.0 millimeters, 8.0 millimeters, 10.0 millimeters, or any value therebetween. For example, the width may be greater than 3.0 millimeters. In other examples, the width may be less than 10.0 millimeters. In yet other examples, the width may be in a range of 3.0 millimeters to 10.0 millimeters.

The locking receptacle 240 may have an aperture 241 through which the locking protrusion 230 may be inserted, as shown in FIG. 3. The aperture 241 may include a height 242 (e.g., in the z-direction). The height 242 may be within the ranges provided above. A thickness (e.g., in the z-direction) (not labeled) of the locking protrusion 230 is less than the height 242 of the aperture 241 in order for the locking protrusion 230 to be inserted into the aperture 241.

The locking receptacle 240 may have an internal depth 244. The internal depth 244 may be within the ranges provided above. As shown in FIG. 6, the locking protrusion 230 may be shorter than the internal depth 244 of the locking receptacle 240. In other implementations, the locking protrusion 230 may be of sufficient length to abut the top surface (not labeled) of the locking receptacle 240. The locking receptacle 240 may include an inclined surface 246 and a bottom surface 248.

The docking mechanism 220 may include a wedging member 250. The wedging member 250 may include a back surface 256, a front surface 257, a bottom surface 258, and a top surface (not labeled). The wedging member 250 may interact with the inclined surface 246 and/or the locking detent 260 to retain the locking protrusion 230 within the locking receptacle 240. As shown in FIG. 3, the wedging member 250 may start in the undocked configuration. The front surface 257 of the wedging member 250 may interact with the back surface 237 of the locking protrusion 230. For example, as the locking protrusion 230 is inserted into the locking receptacle 240, as shown in FIG. 4, the locking protrusion 230 may abut the front surface 257 (e.g., by the back surface 237 of the locking protrusion 230). As shown in FIGS. 3 and 6, the wedging member 250 may abut the inclined surface 246 in both the undocked and restraining states.

The abutting relationship between the wedging member 250 and the inclined surface 246 may be facilitated by a biasing member 252. For example, the top surface of the wedging member 250 may interact with the biasing member 252. The biasing member 252 may bias the wedging member 250 toward the bottom surface 248 of the locking receptacle 240. The locking detent 260 may include a biasing member 262. The biasing member 262 may bias the locking detent toward the front surface 239 of the locking protrusion 230.

The biasing members 252, 262 may include a spring, a coiled spring, a flat spring, formed sheet metal, opposing magnets, an elastically deformable material, other biasing members, or combinations thereof. The one or more of the biasing members 252, 262 may apply a continuous biasing force. The biasing members 252, 262 may have spring rates that increases as the biasing member is compressed (and/or elongated if the biasing member is in tension). In some implementations, the spring rate may be constant. In other implementations, the spring rate may not be constant.

As shown in FIG. 3, the inclined surface 246 may be disposed at an angle $\theta_{246}$. The angle $\theta_{246}$ of the inclined surface 246 correlates with the frictional force applied by the inclined surface 246 to the locking protrusion 230. For example, the force of friction (e.g., toward the aperture 241) of the wedging member 250 on the locking protrusion 230 may correspond to the angle $\theta_{246}$ of the inclined surface 246 and the coefficient of friction of the inclined surface 246 and the locking protrusion 230. In at least one implementation, the angle $\theta_{246}$ may be 22.62 degrees. In some implementations, the angle $\theta_{246}$ may be in a range having an upper value, a lower value, or upper and lower values including any of 5.0 degrees, 10.0 degrees, 15.0 degrees, 20.0 degrees, 25.0 degrees, 30.0 degrees, 35.0 degrees, 40.0 degrees, 45.0 degrees, 50.0 degrees, 55.0 degrees, 60.0 degrees, or any value therebetween. For example, the angle $\theta_{246}$ may be greater than 5.0 degrees. In other examples, the angle $\theta_{246}$ may be less than 60.0 degrees. In yet other examples, the angle $\theta_{246}$ may be in a range of 5.0 degrees to 60.0 degrees. The larger the angle $\theta_{246}$, the smaller the coefficient of friction required to resist removal of the locking protrusion 230. The smaller the angle $\theta_{246}$, the larger the coefficient of friction required to resist removal of the locking protrusion 230.

FIG. 4 illustrates that the frictional force between the locking protrusion 230 and the wedging member 250 may move the wedging member toward the top surface of the locking receptacle 240 as the locking protrusion 230 is inserted into the locking receptacle 240. FIG. 5 illustrates the locking protrusion 230 completely inserted into the locking receptacle 240. At this moment, the wedging member 250 may transition toward and/or to the restraining state shown in FIG. 6.

In some implementations, the coefficient of friction of the wedging member 250 and the inclined surface 246 may be the same, may differ by less than 0.5, may differ by less than 1.0, may differ by less than 1.5, or may differ by less than 2.0. In some implementations, the coefficient of friction of the wedging member 250 and/or the inclined surface 246 may be in a range having an upper value, a lower value, or upper and lower values including any of 0.1, 0.15, 0.20, 0.22, 0.24, 0.26, 0.28, 0.30, 0.32, 0.34, 0.36, 0.38, 0.40, or any value therebetween. For example, the coefficient of friction may be greater than 0.20. In other examples, the coefficient of friction may be less than 0.40. In yet other examples, the coefficient of friction may be in a range of 0.10 to 0.40.

In at least one implementation, only the wedging member 250 or only the locking detent 260 may be used. For example, in implementations with only a wedging member 250, the wedging member 250 may restrain the locking protrusion 230 between the wedging member 250 and an inner surface of the locking receptacle 240. In another example, in implementations with only a locking detent 260, the locking detent 260 may restrain the locking protrusion 230 between the locking detent 260 and an inner surface of the locking receptacle 240.

The locking detent 260 may include a back surface 269. The back surface 269 may interact with the front surface 239 of the locking protrusion 230. For example, as shown, the back surface 269 has a curved shape in cross-section. The curved shape of the back surface 269 creates a contact point at the apex of the curve. Thus, a curved back surface 269 may create line (e.g., for a cylindrical shape) or point (e.g., for a spherical shape) contact with the front surface 239 of the locking protrusion 230, where the front surface 239, for example, is flat or has a radius of curvature greater than a radius of curvature of the back surface 269 of the locking detent 260. In other words, contact between the locking detent 260 and the locking protrusion 230 may be in the form of a point (e.g., for a three-dimensional curved back surface 269) to surface (e.g., for a flat front surface 239), to line (e.g., for a two-dimensional curved front surface 239), to point (e.g., for a three-dimensional curved front surface 239) contact; a line (e.g., for a two-dimensional curved back surface 269) to surface (e.g., for a flat front surface 239), to line (e.g., for a two-dimensional curved front surface 239), to point (e.g., for a three-dimensional curved front surface 239) contact; or a surface (e.g., for a flat back surface 269) to surface (e.g., for a flat front surface 239), to line (e.g., for a two-dimensional curved front surface 239), to point (e.g., for a three-dimensional curved front surface 239) contact. When the locking detent 260 applies a force to the locking protrusion 230, surface-to-surface contact spreads the force over the overlapping surfaces, line-to-line contact spreads the force over the overlapping lines, and point-to-point contact spreads the force over the overlapping points. The type of contact (e.g., point to point, to line, or to surface; line to point, to line, or to surface; or surface to point, to line, or to surface) may affect the frictional coefficient selected for an interface (e.g., between the wedging member 250 and the locking receptacle 240, the wedging member 250 and the locking protrusion 230, and the locking detent 260 and the locking protrusion 230).

Retention of the locking protrusion 230 in the locking receptacle 240 may be based on the force applied by the wedging member 250 and/or the locking detent 260 to the locking protrusion 230. For example, the wedging member 250 and/or the locking detent 260 may apply force to the locking protrusion 230.

The locking protrusion 230, the locking receptacle 240, the wedging member 250, the locking detent 260, other components of the docking mechanism 220, or combinations thereof may be formed of various materials. For example, the locking receptacle 240 may be formed of magnesium and the locking protrusion 230, wedging member 250, and locking detent 260 may be formed of stainless steel. In some implementations, one or more components of the docking mechanism 220 may be formed of the same material and/or different materials.

In implementations where the back surface 269 of the locking detent 260 is curved in three dimensions, the back surface 269 may deform the front surface 239 of the locking protrusion 230. For example, the locking protrusion 230 may have a lower yield strength than the yield strength of the locking detent 260. In some implementations, the difference in yield strength between the locking detent 260 and the locking protrusion 230 may be in a range having an upper value, a lower value, or upper and lower values including any of 50 megapascals (MPa), 100 MPa, 150 MPa, 200 MPa, 250 MPa, 300 MPa, or any value therebetween. For example, the difference in yield strength between the locking detent 260 and the locking protrusion 230 may be greater than 50 MPa. In other examples, the difference in yield strength between the locking detent 260 and the locking protrusion 230 may be less than 300 MPa. In yet other examples, the difference in yield strength between the locking detent 260 and the locking protrusion 230 may be in a range of 50 MPa to 300 MPa. Differences in yield strength between the wedging member 250 and the locking protrusion 230 may be in the same ranges as the locking detent 260 and the locking protrusion 230.

Although the Figures illustrate the locking detent 260 on a front side of the locking receptacle 240 (and the wedging member 250 on a back side), in other implementations, the locking detent 260 may be on a back side of the locking receptacle 240 (and the wedging member 250 on the front side). In some implementations, the docking mechanism 220 may include two wedging members 250 and/or two locking detents 260. For instance, a first wedging member 250 may be on a front side of the locking receptacle 240 and a second wedging member 250 may be on a back side of the locking receptacle 240. Two wedging members 250 and/or two locking detents may cooperate to retain the locking protrusion 230 within the locking receptacle 240.

The bottom surface 258 of the wedging member 250 is shown abutting the bottom surface 248 of the locking receptacle 240. In other implementations, the bottom surfaces 248, 258 may not abut.

Figure 7:
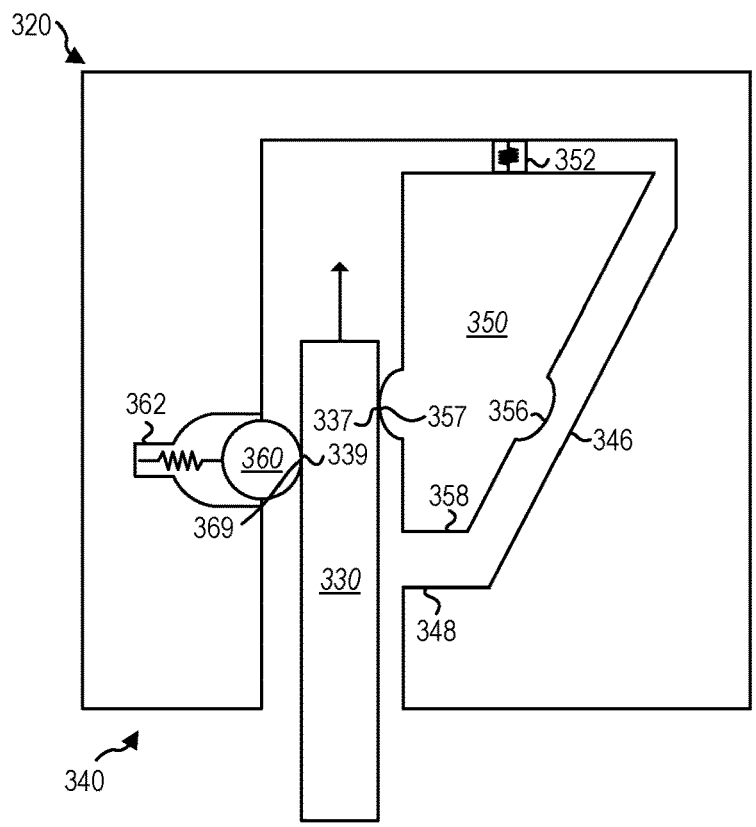
FIG. 7 is a cutaway side view of another implementation of a docking mechanism with a locking protrusion engaged with components of a locking receptacle.
Figure 8:
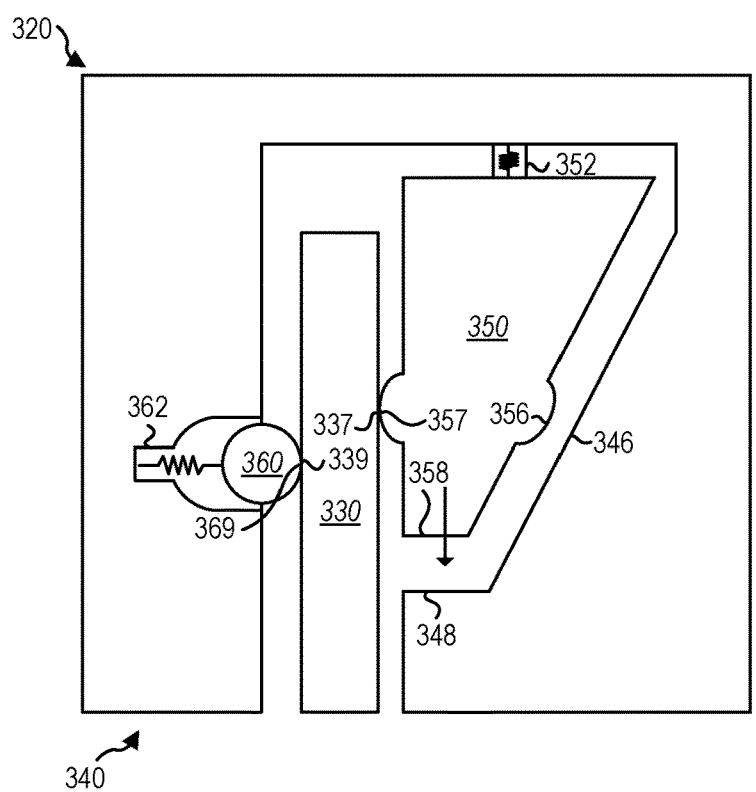
FIG. 8 is a cutaway side view of the implementation of the docking mechanism in FIG. 7 with the locking protrusion fully inserted into the locking receptacle and a biasing member of a wedging member in a biased state.
Figure 9:
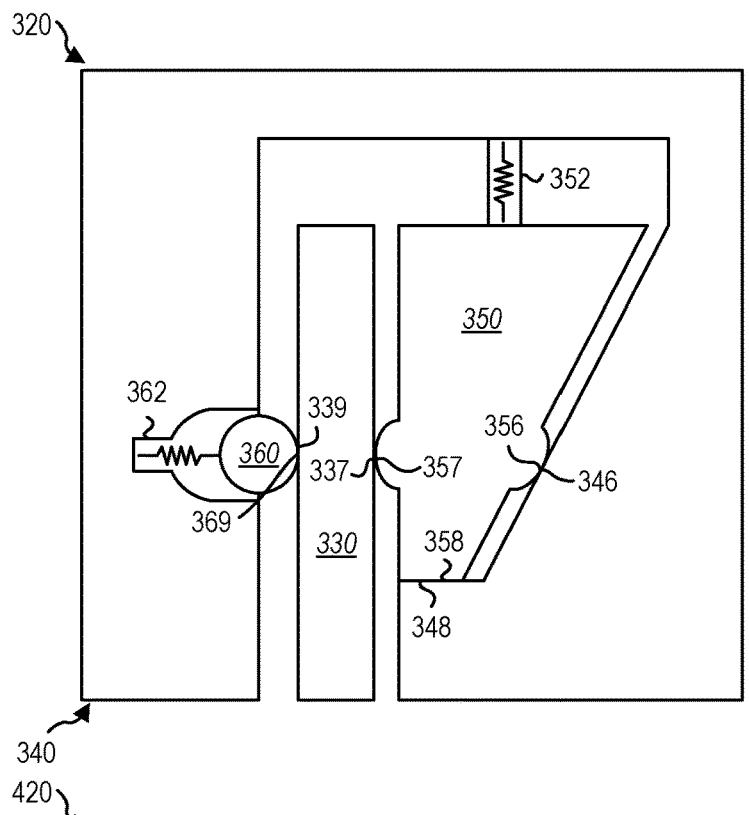
FIG. 9 is a cutaway side view of the implementation of the docking mechanism in FIG. 7 with the locking protrusion fully inserted into the locking receptacle and the wedging member in a restraining state.

FIG. 7 is a cutaway side view of another implementation of a docking mechanism 320 with a locking protrusion 330 engaged with components of a locking receptacle 340. FIG. 8 is a cutaway side view of the implementation of the docking mechanism 320 in FIG. 7 with the locking protrusion 330 fully inserted into the locking receptacle 340 and a biasing member 352 of a wedging member 350 in a biased state. FIG. 9 is a cutaway side view of the implementation of the docking mechanism 320 in FIG. 7 with the locking protrusion 330 fully inserted into the locking receptacle 340 and the wedging member 350 in a restraining state. The other implementation of a docking mechanism 320 shown in FIGS. 7-9 may be similar to the docking mechanism 220 shown in FIGS. 3-6. Like numerals designate like elements.

For ease of description, differences between the docking mechanism 320 and docking mechanism 220 will be highlighted. The description of the docking mechanism 220 is hereby incorporated by reference in its entirety.

The docking mechanism 320 may include one or more of a locking protrusion 330, a locking receptacle 340, a wedging member 350, and a locking detent 360. The locking protrusion 330 may include a back surface 337 and a front surface 339. The locking receptacle 340 may include an inclined surface 346 and a bottom surface 348. The locking detent 360 may include a biasing member 362 and a back surface 369.

The wedging member 350 may differ from the wedging member 250 of FIGS. 3-6. For example, the wedging member 250 is shown in FIGS. 3-6 with a flat (e.g., straight) back surface 356, front surface 357, and bottom surface 358. As shown in FIGS. 7-9, the wedging member 350 may include one or more of an at least partially curved back surface 356 and an at least partially curved front surface 357. As described above with respect to the back surface 269 of the locking detent 260, a curved back surface 356 and/or front surface 357 of the wedging member may provide point or line contact with the inclined surface 346 of the locking receptacle 340 and/or back surface 337 of the locking protrusion 330.

Contact between the wedging member 350 and the locking protrusion 330 may be in the form of a point (e.g., for a three-dimensional curved front surface 357) to surface (e.g., for a flat front surface 339), to line (e.g., for a two-dimensional curved front surface 339), to point (e.g., for a three-dimensional curved front surface 339) contact; a line (e.g., for a two-dimensional curved front surface 357) to surface (e.g., for a flat front surface 339), to line (e.g., for a two-dimensional curved front surface 339), to point (e.g., for a three-dimensional curved front surface 339) contact; or a surface (e.g., for a flat front surface 357) to surface (e.g., for a flat front surface 339), to line (e.g., for a two-dimensional curved front surface 339), to point (e.g., for a three-dimensional curved front surface 339) contact.

Contact between the wedging member 350 and the locking receptacle 340 may be in the form of a point (e.g., for a three-dimensional curved back surface 356) to surface (e.g., for a flat inclined surface 346), to line (e.g., for a two-dimensional curved inclined surface 346), to point (e.g., for a three-dimensional curved inclined surface 346) contact; a line (e.g., for a two-dimensional curved back surface 356) to surface (e.g., for a flat inclined surface 346), to line (e.g., for a two-dimensional curved inclined surface 346), to point (e.g., for a three-dimensional curved inclined surface 346) contact; or a surface (e.g., for a flat back surface 356) to surface (e.g., for a flat inclined surface 346), to line (e.g., for a two-dimensional curved inclined surface 346), to point (e.g., for a three-dimensional curved inclined surface 346) contact.

Contact between the locking detent 360 and the locking protrusion 330 may be in the form of a point (e.g., for a three-dimensional curved back surface 369) to surface (e.g., for a flat front surface 339), to line (e.g., for a two-dimensional curved front surface 339), to point (e.g., for a three-dimensional curved front surface 339) contact; a line (e.g., for a two-dimensional curved back surface 369) to surface (e.g., for a flat front surface 339), to line (e.g., for a two-dimensional curved front surface 339), to point (e.g., for a three-dimensional curved front surface 339) contact; or a surface (e.g., for a flat back surface 369) to surface (e.g., for a flat front surface 339), to line (e.g., for a two-dimensional curved front surface 339), to point (e.g., for a three-dimensional curved front surface 339) contact.

The type of contact (e.g., point to point, to line, or to surface; line to point, to line, or to surface; or surface to point, to line, or to surface) may affect the frictional coefficient selected for an interface (e.g., between the wedging member 350 and the locking receptacle 340, the wedging member 350 and the locking protrusion 330, and the locking detent 360 and the locking protrusion 330).

In implementations where two or more interfacing surfaces is curved (e.g., in two or three dimensions), aligning the two or more interfacing surfaces may be important. For example, as shown in FIG. 9, the front surface 357 of the wedging member 350 and the back surface 369 of the locking detent 360 have curved surfaces. The front surface 357 of the wedging member 350 and the back surface 369 of the locking detent 360 are shown in FIG. 9 as aligned (e.g., in the y-direction) in the restraining state. The closer to aligned the curved surfaces (e.g., back surface 369 and front surface 357), the more direct the application of force from those surfaces. In order to facilitate alignment of the locking detent 360 and the wedging member 350, the locking receptacle 340 may include a bottom surface 348 that may abut with the bottom surface 358 of the wedging member 350.

Figure 10:
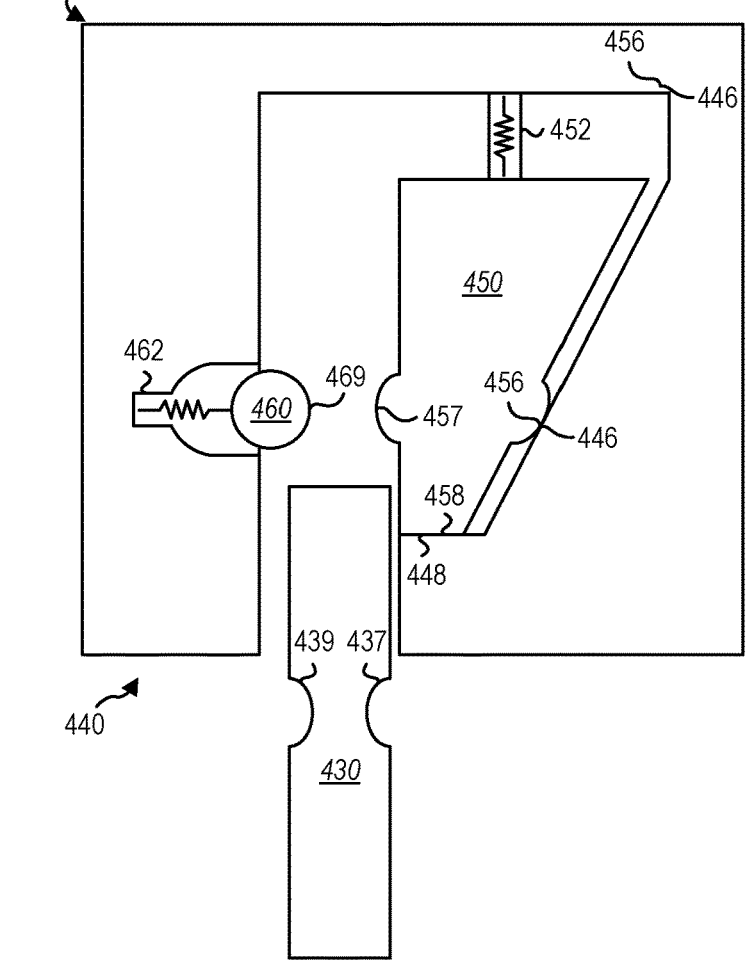
FIG. 10 is a cutaway side view of a further implementation of a docking mechanism with a locking protrusion partially inserted into a locking receptacle.
Figure 11:
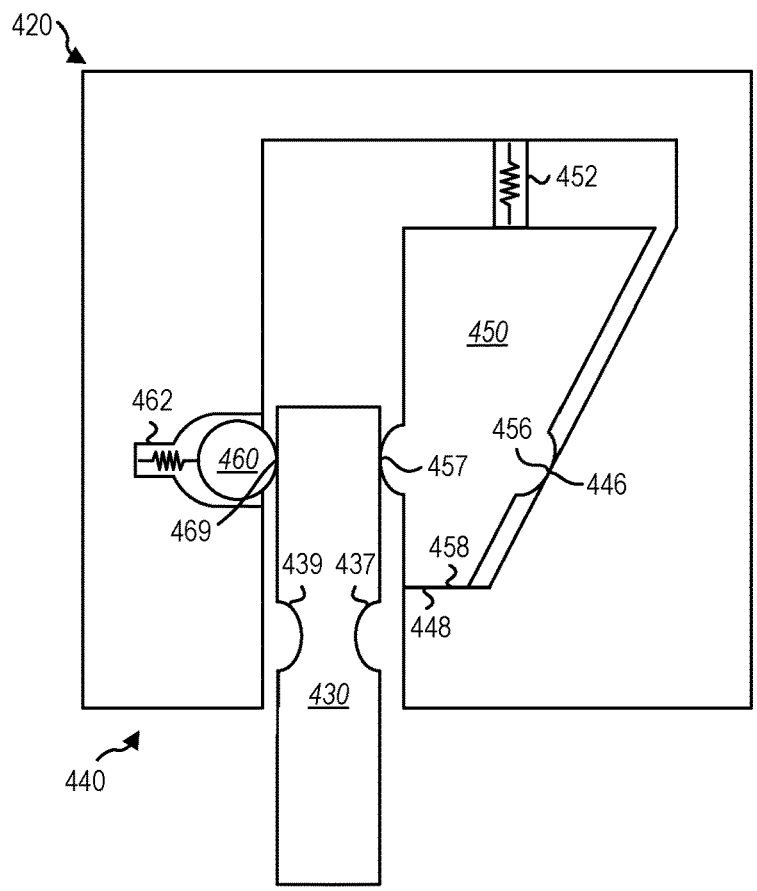
FIG. 11 is a cutaway side view of the implementation of a docking mechanism in FIG. 10 with the locking protrusion engaged with components of the locking receptacle.
Figure 12:
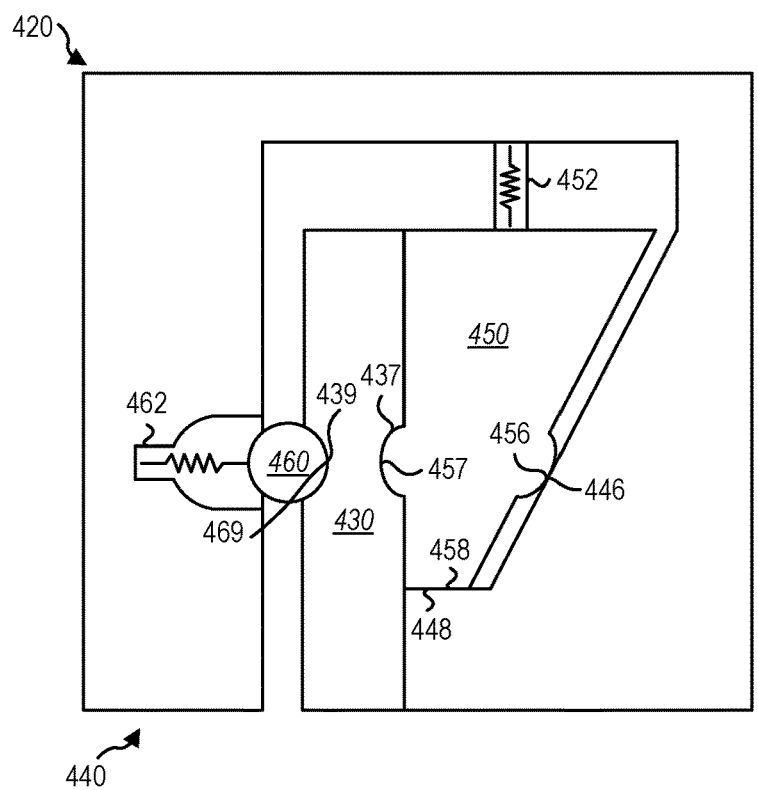
FIG. 12 is a cutaway side view of the implementation of a docking mechanism in FIG. 10 with the locking protrusion fully inserted into the locking receptacle and the wedging member in a restraining state.

FIG. 10 is a cutaway side view of a further implementation of a docking mechanism 420 with a locking protrusion 430 partially inserted into a locking receptacle 440. FIG. 11 is a cutaway side view of the implementation of a docking mechanism 420 in FIG. 10 with the locking protrusion 430 engaged with components of the locking receptacle 440. FIG. 12 is a cutaway side view of the implementation of a docking mechanism 420 in FIG. 10 with the locking protrusion 430 fully inserted into the locking receptacle 440 and the wedging member 450 in a restraining state. The further implementation of a docking mechanism 420 shown in FIGS. 10-12 may be similar to the docking mechanisms 220, 320 shown in FIGS. 3-6 and 7-9, respectively. Like numerals designate like elements.

For ease of description, differences between the docking mechanism 420 and docking mechanisms 220, 320 will be highlighted. The description of the docking mechanisms 220, 320 are hereby incorporated by reference in their entireties.

The docking mechanism 420 may include one or more of a locking protrusion 430, locking receptacle 440, a wedging member 450, and a locking detent 460. The locking receptacle 440 may include an inclined surface 446 and a bottom surface 448.

The locking protrusion 430 may include a back surface 437 and a front surface 439. The back surface 437 and the front surface 439 are shown as being at least partially curved. The back surface 437 and the front surface 439 may be concave, as shown.

The wedging member 450 may include a biasing member 452, a back surface 456, a front surface 457, and a bottom surface 458. The back surface 456 and the front surface 457 may be convex, as shown. The locking detent 460 may include a biasing member 462 and a convex back surface 469.

The concave back surface 437 of the locking protrusion 430 may interface with the convex front surface 457 of the wedging member 450. Because the back surface 437 is concave and the front surface 457 is convex, these surfaces are complementary and have surface-to-surface contact. In implementations where two interfacing surfaces are complementary (e.g., one is concave and one is convex), the two surfaces may have even lower coefficients of friction due to the inclined (e.g., curved) surfaces.

Figure 16:
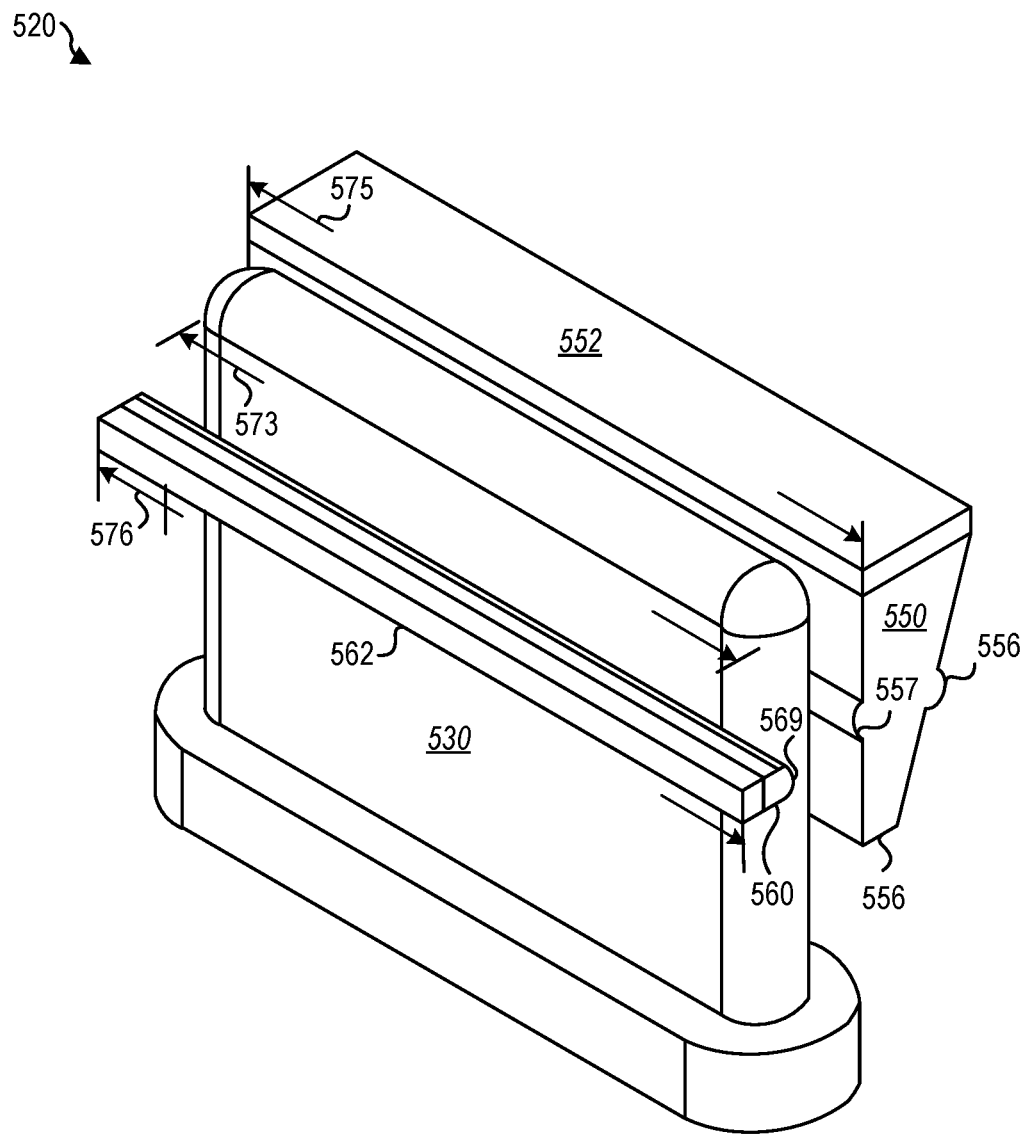
FIG. 16 is an exploded isometric view of the implementation of a docking mechanism in FIG. 13.

FIG. 13 is a cutaway side view of yet another implementation of a docking mechanism 520 in an undocked configuration. FIG. 14 is a cutaway side view of the implementation of the docking mechanism 520 in FIG. 13 with the locking protrusion 530 partially inserted into the locking receptacle 540. FIG. 15 is a cutaway side view of the implementation of a docking mechanism 520 in FIG. 13 with the locking protrusion 530 fully inserted into the locking receptacle 540 and a biasing member 552 of a wedging member 550 in a restraining state. FIG. 16 is an exploded isometric view of the implementation of a docking mechanism 520 in FIG. 13.

The yet another implementation of a docking mechanism 520 shown in FIGS. 10-12 may be similar to the docking mechanisms 220, 320, 420 shown in FIGS. 3-6, 7-9, and 10-12, respectively. Like numerals designate like elements.

For ease of description, differences between the docking mechanism 520 and docking mechanisms 220, 320, 420 will be highlighted. The description of the docking mechanisms 220, 320, 420 are hereby incorporated by reference in their entireties.

The docking mechanism 520 may include one or more of a locking protrusion 530, locking receptacle 540, a wedging member 550, and a locking detent 560 and back surface 569. The locking protrusion 530 may include a back surface 537 and a front surface 539. The locking receptacle 540 may include an inclined surface 546 and a bottom surface 548. The locking receptacle 540 may have a width 543 and an internal depth 544. The internal depth (e.g., depth 244) may be within the ranges provided above. The wedging member 550 may include an at least partially curved back surface 556 and front surface 557 and a bottom surface 558.

The locking receptacle 540 is shown with a separate top surface (not labeled). The top surface may be attached to the rest of the locking receptacle 540. The biasing members 552, 562 of the wedging member 550 and the locking detent 560, respectively, may include a resilient strip FIG. 16 illustrates the relative widths (e.g., width 573 of the locking protrusion 530, width 575 of the wedging member 550, and width 576 of the locking detent 560) of various components of the docking mechanism 520. As shown, the width 573 of the locking protrusion 530 may be smaller than both the width 575 of the wedging member 550 and the width 576 of the locking detent 560. Also as shown, the width 575 of the wedging member 550 may be the same as the width 576 of the locking detent 560. In other implementations, two or more of the width 573 of the locking protrusion 530, the width 575 of the wedging member 550, and the width 576 of the locking detent 560 may be the same. In further implementations, two or more of the width 573 of the locking protrusion 530, the width 575 of the wedging member 550, and the width 576 of the locking detent 560 may be different. In implementations where the width 573 of the locking protrusion 530 is smaller than one or more of the width 575 of the wedging member 550 and the width 576 of the locking detent 560, it may be easier to insert the locking protrusion 530 into the locking receptacle 540.

One or more methods for restraining two portions of a computing device are described. The methods may be used with one or more of the docking mechanisms 120, 220, 320, 420, 520 described herein. In one implementation, the method may include inserting a locking protrusion of a first portion into a locking receptacle of a second portion. A separation force may be applied between the first portion and the second portion. If the separation force is less than 40 Newtons, separation of the first portion from the second portion may be resisted. If the separation force is greater than 50 Newtons, the first portion may be separated from the second portion.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A docking mechanism, comprising:
   a locking protrusion;
   a locking receptacle configured to receive the locking protrusion and having an inclined surface;
   a wedging member abutting the inclined surface; and
   a locking detent located within the locking receptacle, the locking detent having a biasing member configured to bias the locking detent towards the locking protrusion.

2. The docking mechanism of claim 1, wherein one or more of the wedging member and the locking detent are in surface contact with the locking protrusion.

3. The docking mechanism of claim 1, wherein one or more of the wedging member and the locking detent are in line contact with the locking protrusion.

4. The docking mechanism of claim 1, wherein one or more of the wedging member and the locking detent are in point contact with the locking protrusion.

5. The docking mechanism of claim 1, wherein one or more of the wedging member and the locking detent are in at least partial surface contact with the locking protrusion.

6. The docking mechanism of claim 1, wherein the wedging member and the locking detent are both in line contact with the locking protrusion.

7. The docking mechanism of claim 1, wherein the wedging member and the locking detent are both in point contact with the locking protrusion.

8. The docking mechanism of claim 1, wherein the wedging member is in line contact with the inclined surface.

9. The docking mechanism of claim 1, wherein the wedging member is in point contact with the inclined surface.

10. The docking mechanism of claim 1, wherein the wedging member includes a curved surface.

11. The docking mechanism of claim 1, wherein the wedging member includes a curved back surface.

12. The docking mechanism of claim 1, wherein the wedging member includes a curved front surface.

13. The docking mechanism of claim 1, wherein a first coefficient of friction between the wedging member and the inclined surface is the same as a second coefficient of friction between the wedging member and the locking protrusion.

14. The docking mechanism of claim 1, wherein a first coefficient of friction between the wedging member and the inclined surface is between 0.2 and 0.4.

15. The docking mechanism of claim 1, wherein the locking detent, the wedging member, and the locking protrusion cooperate to retain the locking protrusion within the locking receptacle until a separation force of greater than 28 Newtons is applied.

16. The docking mechanism of claim 15, wherein the separation force is less than 50 Newtons is applied.

17. The docking mechanism of claim 1, further comprising one or more magnets, wherein the one or more magnets, the locking detent, the wedging member, and the locking protrusion cooperate to retain the locking protrusion within the locking receptacle until a separation force of greater than 28 Newtons is applied.

18. The docking mechanism of claim 1, wherein a height of the locking protrusion is less than 5 mm.

19. A computing device, comprising:
    a locking protrusion;
    a locking receptacle configured to receive the locking protrusion and having an inclined surface;
    a wedging member having a biasing member configured to bias the wedging member toward the locking protrusion, at least a portion of a front surface of the wedging member being curved and at least a portion of a back surface of the wedging member being curved, the curved portion of the back surface abutting the inclined surface in a restraining state, the curved portion of the front surface abutting the locking protrusion in a biased state; and
    a locking detent having a biasing member configured to bias the detent towards the locking protrusion, one or more of the wedging member and the locking protrusion or the locking detent and the locking protrusion being in line to surface, point to surface, line to line, point to line, or point to point contact.

20. The docking mechanism of claim 19, wherein a first coefficient of friction between the wedging member and the inclined surface is the same as a second coefficient of friction between the wedging member and the locking protrusion.

21. The docking mechanism of claim 19, wherein a first coefficient of friction between the wedging member and the inclined surface is between 0.2 and 0.4.

22. The docking mechanism of claim 19, wherein the locking detent, the wedging member, and the locking protrusion cooperate to retain the locking protrusion within the locking receptacle until a separation force of greater than 28 Newtons is applied.

23. The docking mechanism of claim 19, further comprising one or more magnets, wherein the one or more magnets, the locking detent, the wedging member, and the locking protrusion cooperate to retain the locking protrusion within the locking receptacle until a separation force of greater than 28 Newtons is applied.

24. The docking mechanism of claim 19, wherein a height of the locking protrusion is less than 5 mm.

25. The docking mechanism of claim 19, wherein a first coefficient of friction between the wedging member and the inclined surface is between 0.2 and 0.4.

26. The docking mechanism of claim 19, wherein a height of the locking protrusion is less than 5 mm.

27. A method for restraining two portions of a computing device, comprising:
    inserting a locking protrusion of a first portion into a locking receptacle of a second portion, the locking receptacle having an inclined surface, a wedging member abutting the inclined surface, and a locking detent within the locking receptacle, the locking detent having a biasing member configured to bias the locking detent towards the locking protrusion;
    applying a separation force between the first portion and the second portion;
    if the separation force is less than 40 Newtons, resisting separation of the first portion from the second portion; and
    if the separation force is greater than 50 Newtons, separating the first portion from the second portion.

28. The docking mechanism of claim 27, wherein a first coefficient of friction between the wedging member and the inclined surface is the same as a second coefficient of friction between the wedging member and the locking protrusion.

* * * * *